Feb. 21, 1967 S. O. SAMPSON 3,305,188

TAPE CARTRIDGE

Filed April 17, 1964 2 Sheets-Sheet 1

INVENTOR.
SIDNEY O. SAMPSON

BY Joltan H. Polachek

ATTORNEY

Feb. 21, 1967 S. O. SAMPSON 3,305,188
TAPE CARTRIDGE
Filed April 17, 1964 2 Sheets-Sheet 2

INVENTOR.
SIDNEY O. SAMPSON
BY Zoltan H. Polachek
ATTORNEY

United States Patent Office 3,305,188

Patented Feb. 21, 1967

3,305,188

TAPE CARTRIDGE

Sidney O. Sampson, New York, N.Y., assignor to Robot Education Systems, New York, N.Y., a corporation of New York Substituted for abandoned application Ser. No. 193,542, May 9, 1962. This application Apr. 17, 1964, Ser. No. 364,877

1 Claim. (Cl. 242—55.13)

This invention relates to magnetic tape cartridges and more particularly concerns a novel casing for a reel of magnetic tape.

The invention is particularly applicable to packaging a reel of magnetic tape having transparent ends utilized in association with photoelectric control means in an automatically operated tape recorder for starting, stopping and reversing the tape. Such automatically operated recorders with associated photoelectric control means are described in my prior Patents 2,952,416; 2,952,746; 2,971,716 and 2,976,372.

One object of the invention is to provide a packaged reel of magnetic tape which can be installed and played in a recorder without removal of the reel from the package.

Another object is to provide a novel casing or package for a reel of magnetic tape arranged so that the tape can be scanned by photoelectric means in a recorder for operating automatic controls of the recorder.

A further object is to provide a novel magnetic tape cartridge which can be used for storage and shipment of a reel of prerecorded tape and which enables the tape to be played in a recorder without removal from the cartridge.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

FIG. 1 is a partially diagrammatic plan view of a magnetic tape recorder with a cartridge embodying the invention mounted thereon.

FIGS. 2, 3 and 4 are sectional views on an enlarged scale taken on lines 2—2, 3—3 and 4—4 of FIG. 1.

Figure 1:
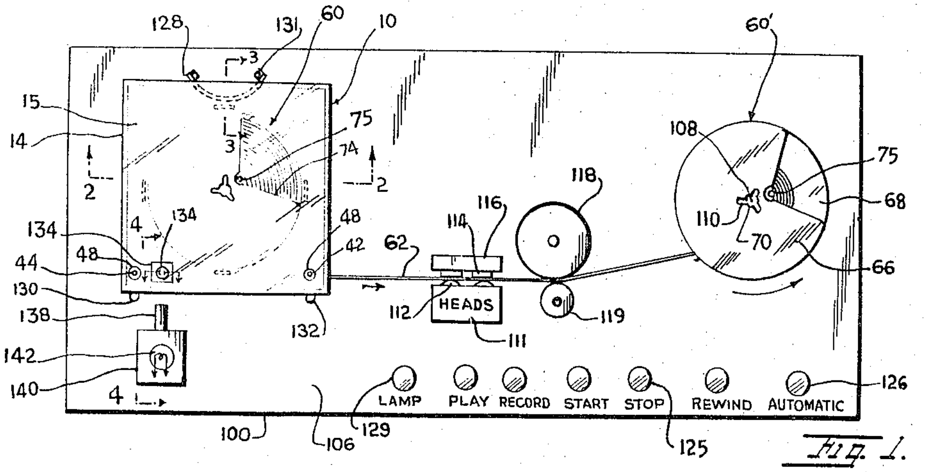
Figures 2, 3, 4:
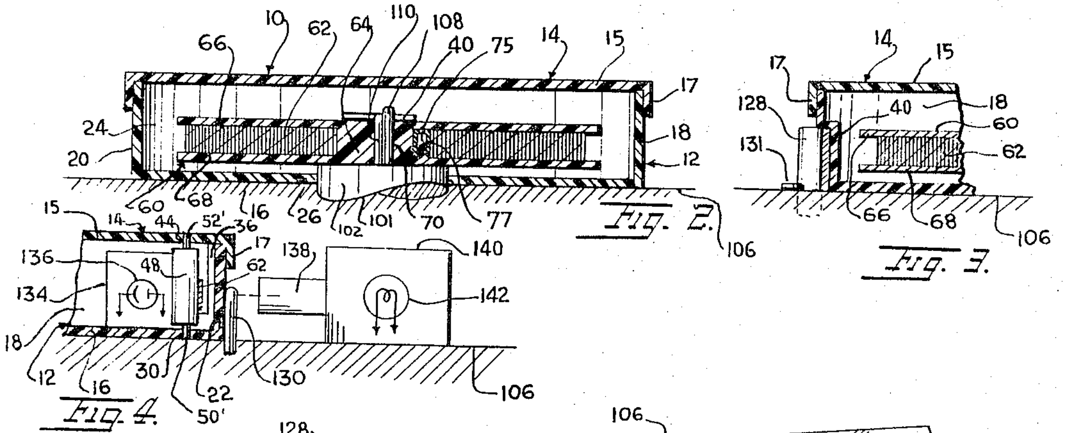

Referring to FIGS. 1–4, 6 and 7, there is shown a magnetic tape cartridge 10 including a casing having a rectangular base 12 and cover 14. The base 12 is a rectangular member with open top. The base has a rectangular bottom 16, upstanding parallel side walls 18, 20, front end wall 22 and rear end wall 24. In the bottom 16 is a centrally located round hole 26, two holes 28, 30 located near opposite front corners and a rectangular hole 32 located near the front and side walls 22, 20. In the front wall is hole 34, aligned in a vertical plane with hole 32. A slot 36 is formed in side wall 18 near the front end thereof. In the rear wall is a centrally located arcuate recess or notch 40. The base may be made of metal, plastic or composition material. If desired, parts of the base may be made of transparent material or the entire base may be transparent. Hole 34 may be omitted if wall 22 is transparent.

The cover 14 has a rectangular top 15 and depending integral rectangular flanges 17 which frictionally engage the side and end walls of the base. The width of the flanges 17 is considerably less than the width of the side and end walls of the base so that the hole 34, part of slot 36 and notch 40 are all exposed when the cover is mounted on the base. The cover has two holes 42, 44 located near the front corners of top 15 and aligned with holes 28, 30 respectively when the cover is on the base. The cover is preferably formed of transparent plastic material.

Two idler rollers 46, 48 are rotatably disposed between top 15 and bottom 16. The rollers have axially extending stub shafts 50, 50′ and 52, 52′ which engage in the holes 28, 30 and 42, 44.

A reel 60 carrying a role of magnetic tape 62 is removably disposed in the casing defined by the base and cover. This reel may be of a type described in my copending substitute application entitled Tape Reel for Parallel Tracks Tape Recorders, Serial No. 536,476, filed January 7, 1966. This reel has a central hub 64 and two annular opposing end flanges 66, 68. The hub has a central hole 70 provided with radially extending circumferentially spaced slots 72. The upper flange 66 has a wide angular cutout 74. At its apex 74′ is a peg 75 on which is engaged the inner end 77 of the roll of tape 62. Both the inner end 77 and the outer end 79 of the tape are transparent.

Figure 6:
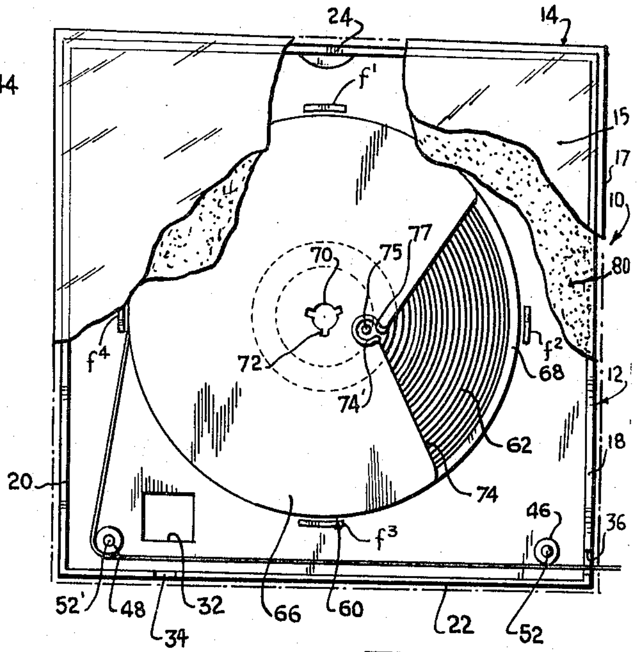
FIG. 6 is a top plan view of the cartridge on an enlarged scale, with parts broken away to show internal construction.
Figure 7:
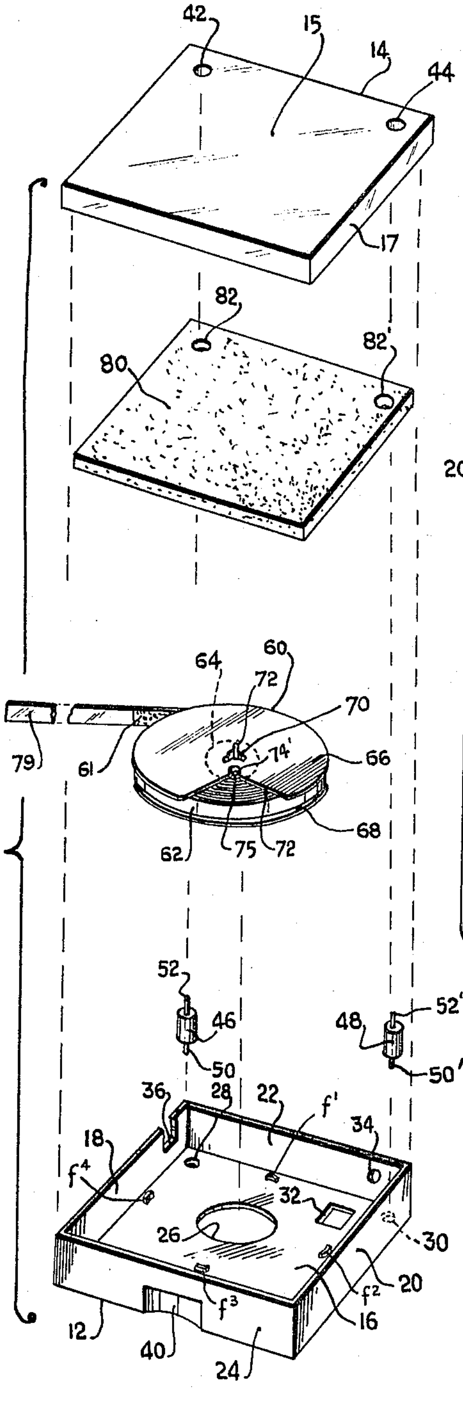
FIG. 7 is an exploded perspective view of parts of the cartridge.

A rectangular pad 80 of foam plastic or rubber shown in FIGS. 6 and 7 is provided between the reel and cover to hold the reel stationary in the base during shipment and storage of the cartridge. For operation of the cartridge, the pad 80 will be removed. The pad has corner holes 82, 82′ to receive the rollers 46, 48.

Figure 5:
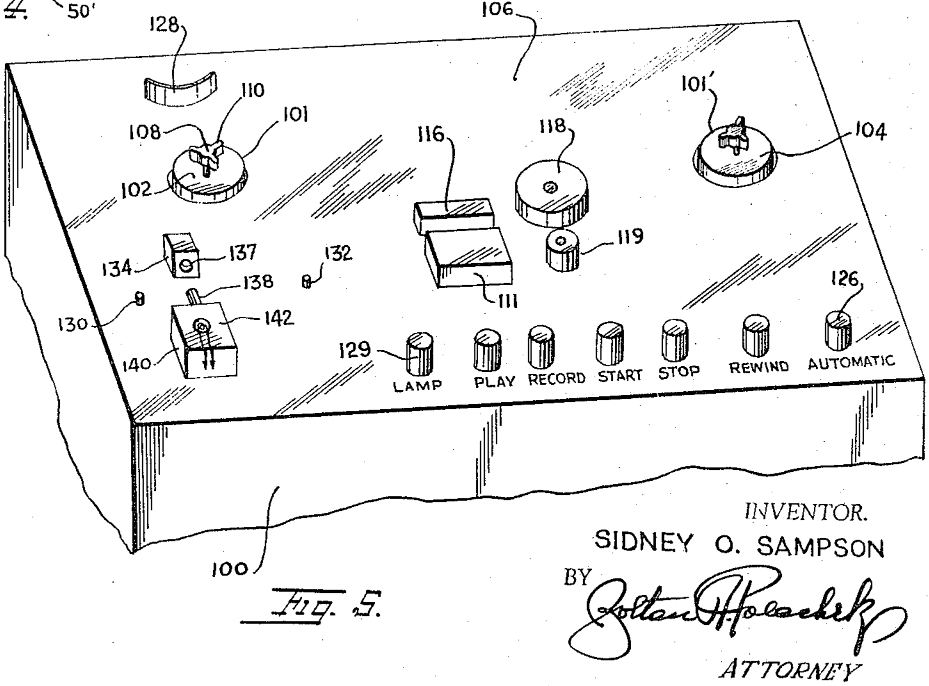
FIG. 5 is a partially diagrammatic fragmentary perspective view of the recorder alone.

The recorder 100 shown in FIGS. 1 and 5 is provided with two rotatable spindles 101, 101′ near opposite sides of the recorder. The spindles have cylindrical platforms 102, 104 which extend above the top 106 of the recorder and provide flat bases on which tape reels 60, 60′ can be supported. Reels 60 and 60′ are identical in structure as described above. Upwardly extending axial spindle shafts 108 have radially extending ribs 110 which engage in the central holes 70 and slots 72 of the tape reels. The recorder has a centrally located assembly 111 of magnetic heads 112 and felt tape pressure members 114 enclosed in a cover 116 opposing heads 112. A tape drive capstan 118 and opposing idler roller 119 are located adjacent the heads for driving the tape between the reels at speeds determined by the internal drive mechanism of the recorder. The recorder has push-button or rotatable controls 125 for manually controlling play, record, start, stop, and rewind functions of the recorder. An additional button or knob 126 sets the recorder for automatic operation. To the extent described the recorder is entirely conventional and forms no part of the present invention.

In FIGS. 1, 6, and 7 are shown upright flanges *f1*, *f2* *f3*, and *f4* which are to be utilized for quickly positioning the tape reel when it is dropped in the casing. The flanges are especially useful during packaging the reel in the casing in cooperation with pad 80. It should be noted that the casing is particularly adapted for the packaging of recorded tape-records as disclosed in my copending application, Means For Automatically Perforating and/or Cutting Magnetic Tapes, Serial No. 173,013, now abandoned. The flanges should be disposed at their shown respective positions at about ⅛″ beyond the free circulating area in which the tape record operates.

The recorder may have an arcuate flexible leaf spring 128 mounted by screws 131 near the rear edge of top 106 for engaging in the notch or recess 40 in the rear wall 24 of cartridge base 12. Two pins 130, 132 may be located forwardly of the spring to serve as abutments for the front wall of the cartridge base and to prevent turning of the cartridge casing on the recorder when the reel 60 is in playing position. The sidewall 18 of the base may slidably fit against the abutment of cover 116 as a means to further securely prevent the cartridge casing from turning. A rectangular housing 134 for a photoelectric cell 136 is mounted on the top 106 and is located to extend through hole 32 in the bottom of the cartridge base. This housing serves as a supplemental stabilizing structure to prevent rotation and lateral displacement of the cartridge on the recorder. The housing has a hole 137 at its front side aligned with tube 138 of a lamp 140 mounted on the recorder forwardly of cell housing 134. The lamp has an electric bulb 142 which illuminates the cell 136 through hole 34 in the front wall of the base 12. A push-button switch or knob 129 is provided on the recorder for switching the lamp bulb on and off. If the front wall of the base 12 is transparent, the hole 34 may be omitted.

Figure 8:
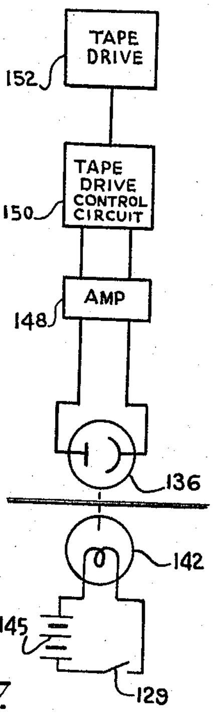
FIG. 8 is a diagram of a photoelectrically controlled circuit of the recorder.

FIG. 8 shows the essential parts of the recorder circuit concerned by the present invention. The lamp bulb 142 is energized by a power supply 145 which may be an external source or a battery 145. The photoelectric cell 136 is connected to an amplifier 148 inside the recorder. The amplifier actuates a tape drive control circuit 150 which controls the tape drive 152. The spindles 101, 101' and capstan 118 are operatively driven by the tape drive 152.

The tape 62 is drawn from the reel 60 and passes around rollers 46, 48 and through slot 36 in side wall 18. The tape then passes between heads 112 and pressure members 114 and is engaged on reel 60'. The tape passes in front of the photoelectric cell 136. The tape is coated with opaque magnetic material 61 except at its ends where it is clear and transparent. Normally the opaque portion blocks the light emitted by lamp 140 from reaching the photoelectric cell. At the transparent ends of the tape the light from the lamp impinges on the photoelectric cell which responds by actuating the amplifier and control circuit 150 for initiating stopping and rewinding functions automatically.

It will be noted that the reel 60 is elevated above the bottom 16 of the base 12 when the reel is mounted on platform 102 of spindle 101. The spindle 101 is concentric with and spaced from hole 26 in base 12. The cover 14 is preferably made of transparent plastic material so that the tape is visible through the cover. Since the reel has cutout 74 at the top, the quantity of tape remaining on the reel is visible to the operator at all times. The operator can operate any of the manual controls of the recorder at will to change the cycle of automatic operation of the recorder.

A pair of leader and trailer lengths of about 40" of clear film may be packaged with the regular tape record and imprinted with identifying indicia for later splicing thereto. The clear film will allow passage of the light from lamp 140 to the photocell 136.

The invention makes it possible for a reel of tape to be mounted on and played in a recorder without ever having to remove the reel from the casing in which it is packaged. Of course, if desired, reel 60 can be removed from the casing and replaced with another reel whenever desired. The casing 12, 14 serves as a dust cover and light shield for the reel 60 when mounted on the recorder and serves to protect the reel during storage and shipment when off the recorder. It is possible to interchange the positions of the photoelectric cell and lamp on the recorder without requiring any changes in the cartridge 10 as described.

Figure 9:
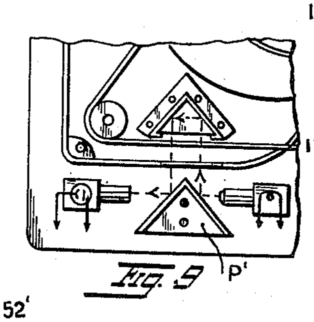
FIG. 9 is a fragmentary plan view showing another arrangement of disposing the optical prism in the casing.

In FIG. 9 is shown an optical prism disposed inside the casing as a means for the modificational displacement therein of photoelectric cell 136. This prism $P^1$ is operationally shown in my Patents 2,952,416 and 2,971,716. In Patent 2,952,746 and my copending application "Four Track Magnetic Recorders," Serial No. 797,412, now abandoned, there is shown respectively in each, a pair of upright posts for sensing the presence of metallic elements on the tape. These posts may also be included in the operation of the casing by employing suitably prepared holes in bottom 16 thus providing optional metallic sensing or photoelectric sensing means. The photoelectric cell, the prism, and the posts are all elements comprising projection means which can be housed in the casing.

The upright posts projecting through the prepared holes in bottom 16 can be utilized in the present invention for guiding the tape from the reel to slot 36 and vice versa, instead of the rollers 46, 48. The casing can be utilized on any conventional type of recorder which may have no projections within the cartridge.

In my Patent 2,971,716 is shown a pair of same-size tape reels with the tape attached to each reel for automatic reversing operations. My experience with this dual tape reel type of cartridge has proved that such types of cartridge are limited in operation to specific types of recorders. There exists a great need for a universal type of cartridge in which any ordinary type of tape reel may be employed. The instant invention completely satisfies this need by providing a single reel universal type cartridge casing adaptable for all types of automatic reversing recorders. Both the tape reel and the casing of the instant invention are especially adaptable for other novel uses.

Their novel features are adaptable to use during tape duplication processing and later packaging of the tape records as described in my tape duplication Patent 2,976,372, and the above referred to copending tape duplication application. During the tape duplication process of the above mentioned copending tape duplication application, the leader and trailer lengths of the tape are perforated and can thus be utilized in the same way for automatic reversing recorder operations as the transparent leaders and trailers are utilized for in the present invention.

While I have illustrated and described the preferred embodiments of my invention, it is to be understood that I do not limit myself to the precise construction herein disclosed and that various changes and modifications may be made within the scope of the invention as defined in the appended claim.

Having thus described my invention, what I claim as new, and desire to secure by United States Letters Patent is:

A universal type of cartridge casing for packaging single tape reels and for use on a tape recorder having a rotatable spindle with a flat top and a ribbed spindle shaft extending axially out of the top of the spindle, comprising in combination: a dished base with open top; a cooperational cover removably mounted on and snugly interfitting with said base for closing the same; said base having a bottom spaced from and parallel to said cover, an upstanding wall around said bottom supporting the cover, said bottom having a centrally located hole to permit said spindle to extend therethrough into the base, separated upright flanges, said separated upright flanges being formed on said bottom and disposed independent from said upstanding wall, said separated upright flanges for packaging and for centrally positioning a circular reel of tape in the base to rest on the top of said spindle and to rotate therewith, roller guide means in said base, said upright flanges being separate from and being cooperative with said roller guide means in said base for operationally guiding the tape to and from the reel as the reel and said spindle rotate, means in a said wall to permit said tape to pass through said upstanding wall to and from said reel, and notch means in the cartridge casing cooperative with spring means and abutment means respectively disposed on the recorder for preventing said base and said cover from rotating while said reel and said spindle rotate.

(References on following page)

References Cited by the Examiner

UNITED STATES PATENTS

| | | | |
|---|---|---|---|
| 2,712,448 | 7/1955 | Schroter | 242—55.12 |
| 2,894,700 | 7/1959 | Roberts et al. | 242—55.13 |
| 2,971,716 | 2/1961 | Sampson | 242—55.13 |
| 3,006,650 | 10/1961 | Ellmore. | |
| 3,027,112 | 3/1962 | Flan | 242—55.13 |
| 3,090,574 | 5/1963 | Doncaster et al. | 242—55.13 |
| 3,159,357 | 12/1964 | Berlings | 242—71.1 |
| 3,169,721 | 2/1965 | Laa et al. | 242—55.13 |
| 3,185,401 | 5/1965 | Hardy | 242—55.13 |
| 3,208,682 | 9/1965 | Pastor et al. | 242—55.13 |

FRANK J. COHEN, *Primary Examiner.*

GEORGE F. MAUTZ, *Examiner.*